United States Patent [19]

Tucker et al.

[11] 4,443,906
[45] Apr. 24, 1984

[54] MACHINE FOR FLOOR MAINTENANCE

[76] Inventors: Hartwell F. Tucker, 1300 Holly Ave., Los Altos, Calif. 94022; Jeffrey R. Tucker, 2544 Katrina Way, Mountain View, Calif. 94040; Dennis Ross, 1746 Carpentier St., San Leandro, Calif. 94577; Jeffrey G. Knirck, 787 Race St., San Jose, Calif. 95126

[21] Appl. No.: 409,845

[22] Filed: Aug. 20, 1982

[51] Int. Cl.³ .................... A47L 11/03; A47L 11/14
[52] U.S. Cl. .................................. 15/50 R; 310/156; 310/268; 318/799
[58] Field of Search .............. 15/49 R, 50 R, 98, 385; 51/170 T, 177; 310/154, 156, 184, 268; 318/138, 434, 799, 810

[56] References Cited

U.S. PATENT DOCUMENTS

| | | | |
|---|---|---|---|
| 1,498,255 | 6/1924 | Winchester | 15/50 R |
| 1,808,656 | 6/1931 | Hartman | 15/50 R |
| 2,114,967 | 4/1938 | Myers | 15/49 R X |
| 2,252,269 | 8/1941 | McQuown | 15/50 R |
| 2,333,829 | 11/1943 | Terry | 15/50 C X |
| 2,993,134 | 7/1961 | Harvey | 310/154 |
| 3,072,813 | 1/1963 | Reijnst et al. | 310/156 |
| 3,924,166 | 12/1975 | Doemen | 318/138 |
| 4,052,648 | 10/1977 | Nola | 318/810 |
| 4,093,882 | 6/1978 | Furuta | 310/268 |
| 4,095,149 | 6/1978 | Wanlass | 318/799 |
| 4,123,576 | 10/1978 | Bevington et al. | 15/49 R |
| 4,125,792 | 11/1978 | Schmider | 310/268 |
| 4,164,675 | 8/1979 | Sato et al. | 310/268 |
| 4,203,048 | 5/1980 | Sato | 310/268 |
| 4,268,782 | 5/1981 | Kawada et al. | 318/434 |
| 4,276,490 | 6/1981 | Saldinger | 310/184 |
| 4,330,897 | 5/1982 | Tucker et al. | 15/246 |

OTHER PUBLICATIONS

DC Motors Speed Controls Servo Systems by Electro-Craft Corporation, published 1980, pp. 6-11 through 6-34.

Primary Examiner—Edward L. Roberts
Attorney, Agent, or Firm—Jack M. Wiseman

[57] ABSTRACT

A machine for floor maintenance comprising an electric motor in which armature coils are included in a stator and pemanent magnets are included in a rotor. The armature coils are disposed substantially radial to the axis of the stator with the axial extent of each coil lesser than the radial extent of each coil, and the permanent magnets of the rotor are disposed substantially radially to the axis of rotation of the rotor with the axial extent of each permanent magnet lesser than the radial extent of each permanent magnet. A three phase switching circuit excites the armature coils to impart rotation to the rotor. As a consequence thereof, the motor has a configuration conforming substantially to the pad or brush of the machine. The pad is attached to the rotor by a pad holder which is formed with a convex surface for engaging the pad. By virtue of this arrangement, increased from the weight of the machine is applied to the area surrounding the axial opening of the pad with a lesser amount of force from the weight of the machine applied to the circumferential area of the pad.

25 Claims, 20 Drawing Figures

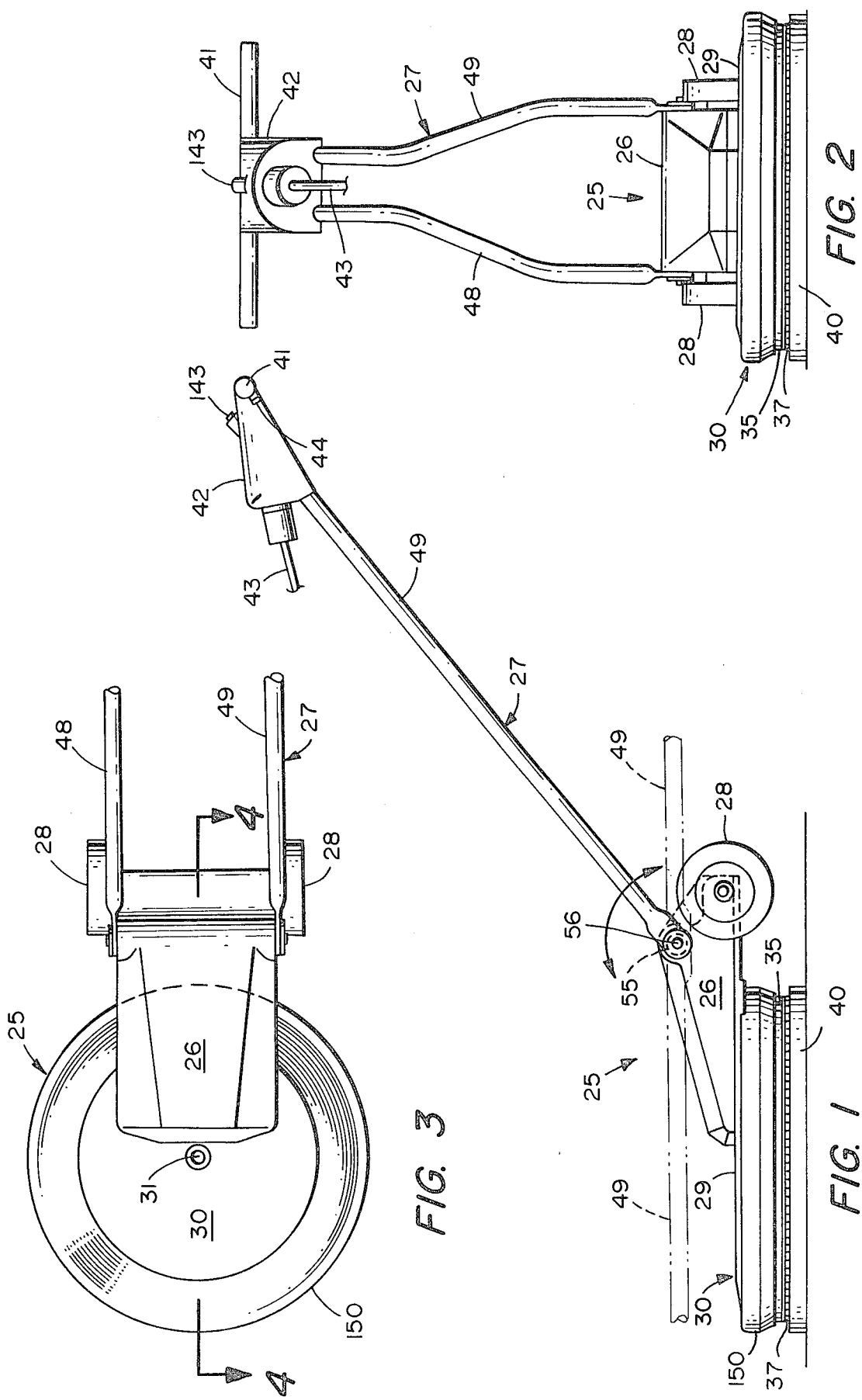

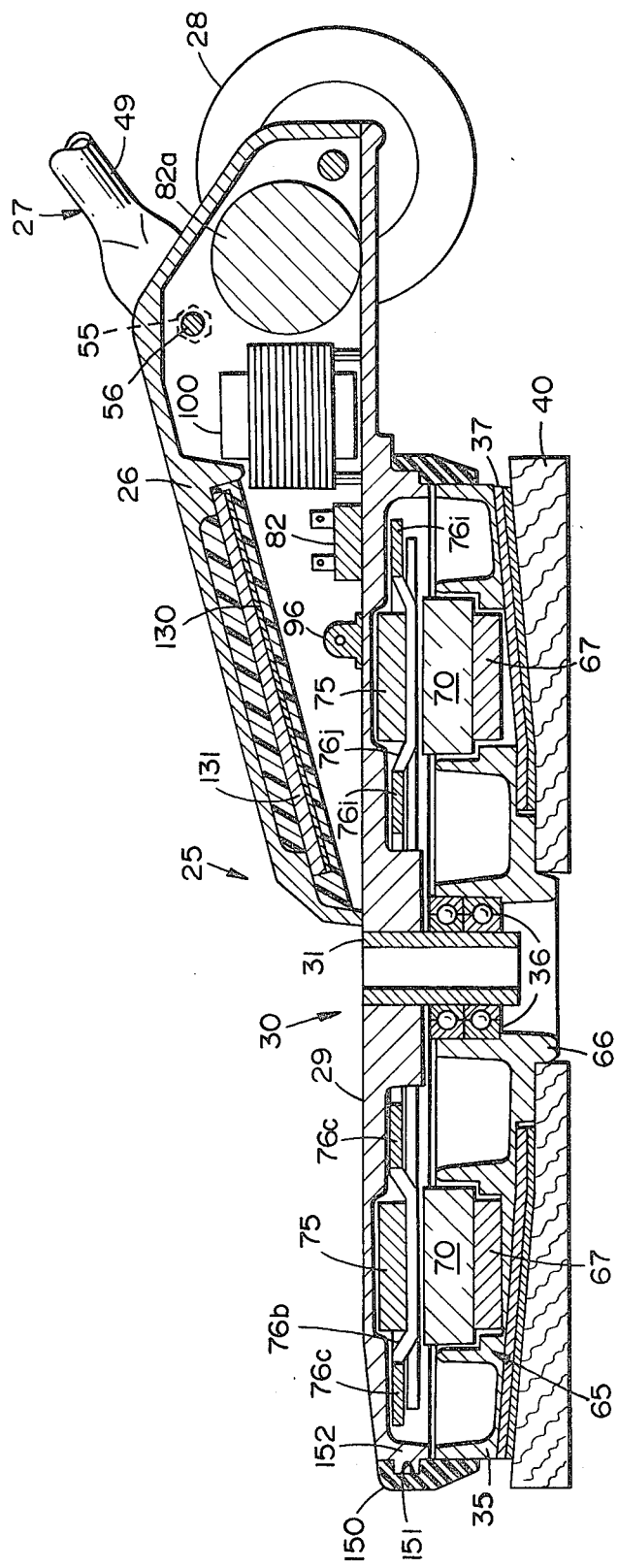
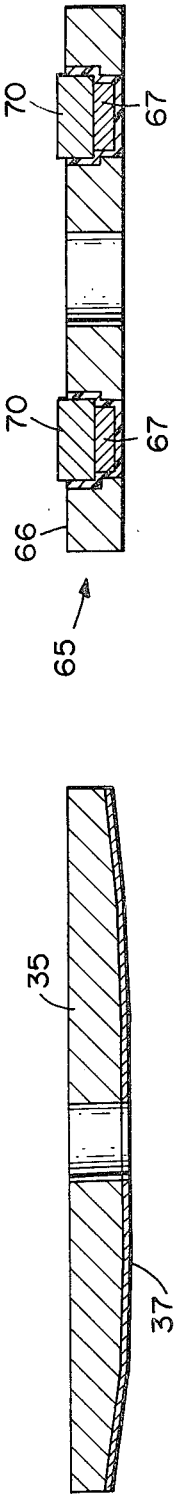
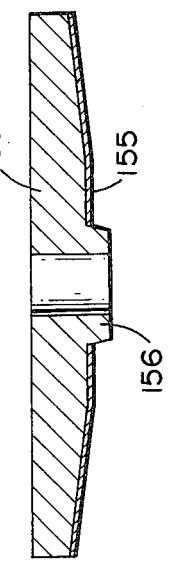
FIG. 4
FIG. 8
FIG. 5
FIG. 19

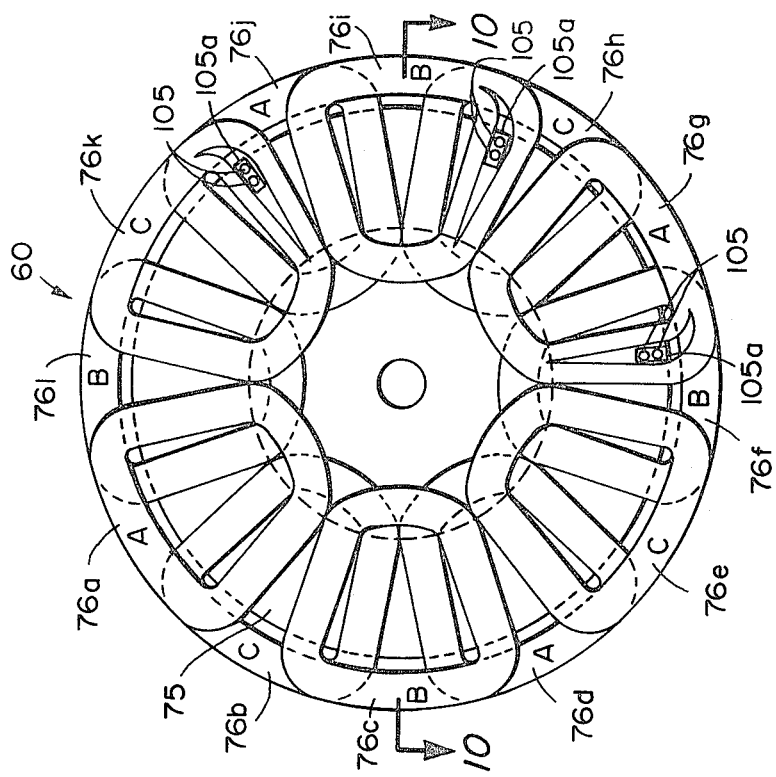
FIG. 9
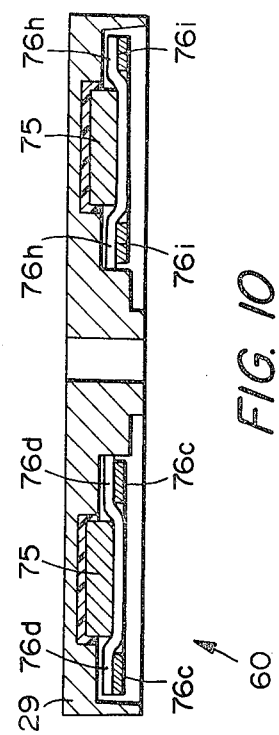
FIG. 10
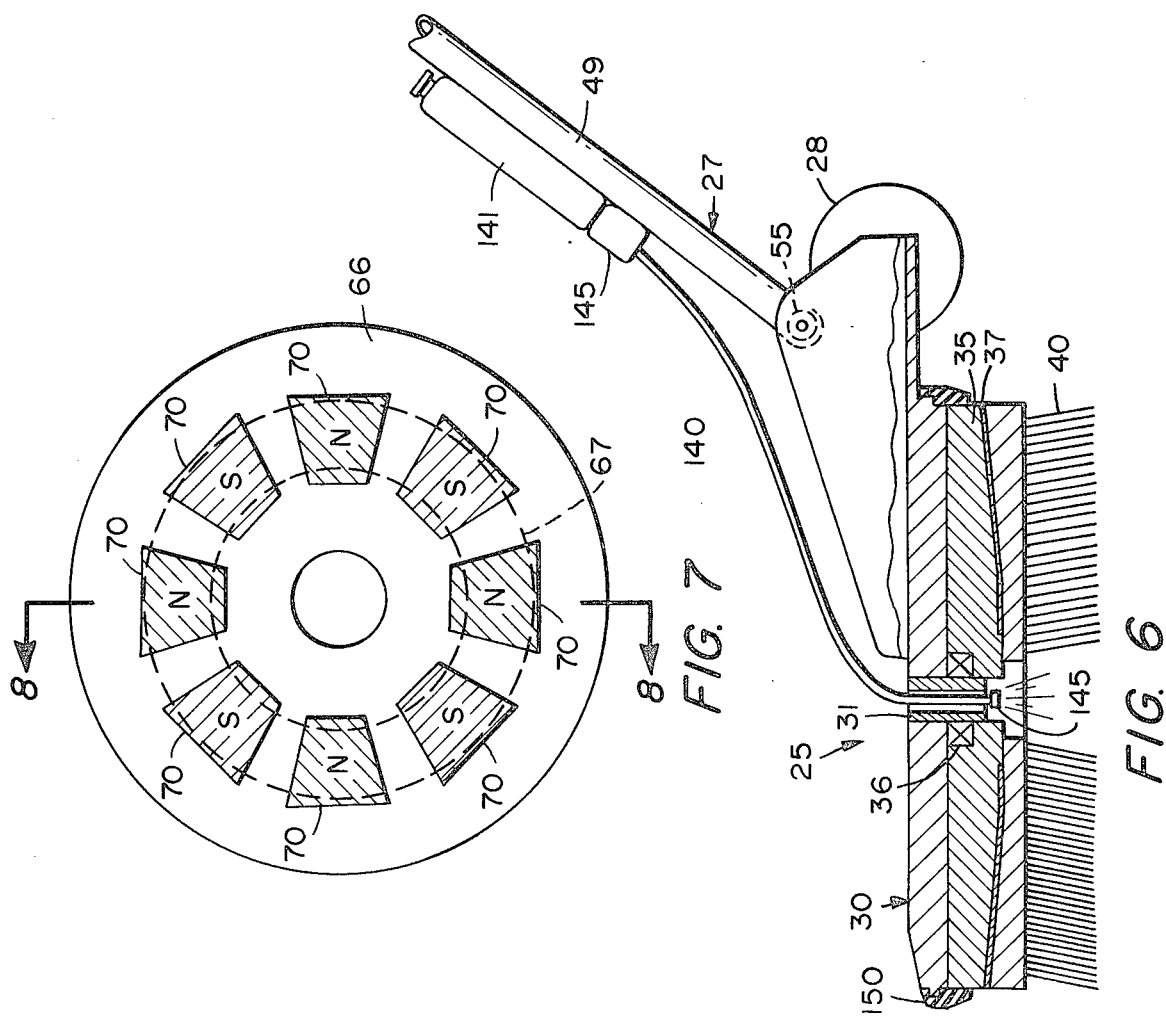
FIG. 7
FIG. 6

MACHINE FOR FLOOR MAINTENANCE

BACKGROUND OF THE INVENTION

Machines for floor maintenance have employed electric motors in which the armature conductors were parallel to the axis of the rotor and the field poles were radial to the axis of the motor. Such motors resulted in a shape having a relatively long axial dimension compared to the radial dimension of the motor. This configuration resulted in a shape lacking conformity with the pad or brush to be driven by the motor. Such motors were of the induction-type motors or the commutated armature type motors with electrical brushes.

Induction type motors generally have low starting torque and the revolutions per minute have been maintained within a limited range. This arrangement has required a reduction drive mechanism. The commutated type motors with electrical brushes produce higher torques and operate over a larger range of revolutions per minute. Generally reduction drive mechanisms are required to reduce the revolutions per minute to desired operating speeds. However, the commutated type motors have short life components, which require frequent replacements. This is particularly recognizable at high speed operations.

Floor maintenance pads are attached to the rotor of a floor machine by a pad holder. Heretofore, the surface of the pad holder containing the pad has been flat. As a consequence thereof, the weight of the machine has been applied substantially evenly across the pad, excepting the area of the pad contiguous with the central hole thereof.

In the patent to Tucker et al., U.S. Pat. No. 4,330,897, issued on May 25, 1982, the Floor Machine, there is disclosed a machine for floor maintenance with pads. The pads are held by a drive unit having drive tufts made of rigid plastic. The patent to Berrington et al., U.S. Pat. No. 4,122,576, issued on Oct. 31, 1978, discloses a floor polishing machine in which a pad is driven by an electric motor through a drive plate. By tilting the shaft of the drive plate, a segment of the pad presses harder against the floor than another segment of the pad.

The patent to Schmider, U.S. Pat. No. 4,125,792, issued on Nov. 14, 1978, for Brushless D-C Motor discloses an axial gap motor which has coreless armature stator windings and a permanent magnet rotor. Sensors sense the rotary position of the motor and control switching of current to the respective armature windings.

The patent to Saldinger, U.S. Pat. No. 4,276,490, issued on June 30, 1981, for Brushless DC Motor With Rare-Earth Magnet Rotor And Segmented Stator discloses a rotor formed with permanent magnets and a stator formed with armature windings. The armature windings are excited by amplifiers of a commutated power source to provide a three phase relationship. Sensors may be provided in lieu of amplifiers to sense the position of the magnets on the rotor for exciting the armature windings.

In the publication, DC Motors Speed Control Servo Systems, by Electra Craft Corporation, published 1980, there is disclosed in pages 6-11 through 6-35 control circuits for brushless d.c. motors.

SUMMARY OF THE INVENTION

A machine for floor maintenance comprising a rotor formed with radially disposed permanent magnets with the axial extent of each permanent magnet smaller than the radial extent of each permanent magnet and a stator formed with a radially disposed armature winding with the axial extent of each coil of the armature winding smaller than the radial extent of each coil of the armature winding for providing a motor having a configuration conforming to the pad or brush of the machine with a reduced axial dimension.

A machine for floor maintenance in which a pad is attached to a rotor by a pad holder assembly which is formed with a convex surface for engaging the pad to increase the force applied from the weight of the machine to the area surrounding the axial opening of the pad and to decrease the force applied from the weight of the machine to the circumferential area of the pad.

By virtue of the present invention, a machine for floor maintenance is provided with improved starting torque that operates over a relatively wide range of revolutions per minute without requiring frequent replacement of worn parts and without being susceptible to damage from overheating.

By reducing the axial length or height of the motor for the floor machine, the floor machine of the present invention has greater access to areas to be cleaned and also have improved stability.

In the present invention, the rotor of the motor drives directly the pad or brush, thus obviating the need for driven members, such as the transmission housing, clutch plate, input shaft and the like.

By virtue of the convex surface for the pad holder assembly engaging the pad, greater force is applied in the area of the pad surrounding the axial opening and a lesser force is applied in the area of the perimeter of the pad. As a consequence thereof, there is an improved work capability without increasing the size of the motor and the wear on the surface of the pad is more evenly distributed.

DESCRIPTION OF THE DRAWINGS

FIG. 1 is a fragmentary diagrammatic side elevation of the machine for floor maintenance embodying the present invention.

FIG. 2 is a diagrammatic front elevation of the machine shown in FIG. 1.

FIG. 3 is a fragmentary diagrammatic top view of the machine shown in FIG. 1.

FIG. 4 is an enlarged diagrammatic vertical section taken along line 4—4 of FIG. 3 to illustrate a motor employed in the machine shown in FIG. 1.

FIG. 5 is a diagrammatic vertical section view taken along line 4—4 of FIG. 3 to illustrate a pad holder employed in the machine shown in FIG. 1.

FIG. 6 is a fragmentary diagrammatic side elevation view, partially in section, of the machine shown in FIG. 1 to illustrate an arrangement for discharging liquid onto a floor through a shaft disposed in the axial direction of the motor.

FIG. 7 is a diagrammatic plan view of a rotor for the motor shown in FIG. 4 with the rotor housing removed.

FIG. 8 is a vertical section taken along line 8—8 of FIG. 7.

FIG. 9 is a diagrammatic bottom view of a stator for the motor shown in FIG. 4 with the stator housing removed.

FIG. 10 is a vertical section taken along line 10—10 of FIG. 9.

FIG. 19 is a modification of the pad holder shown in FIG. 5.

DESCRIPTION OF THE PREFERRED EMBODIMENT

Figure 11:
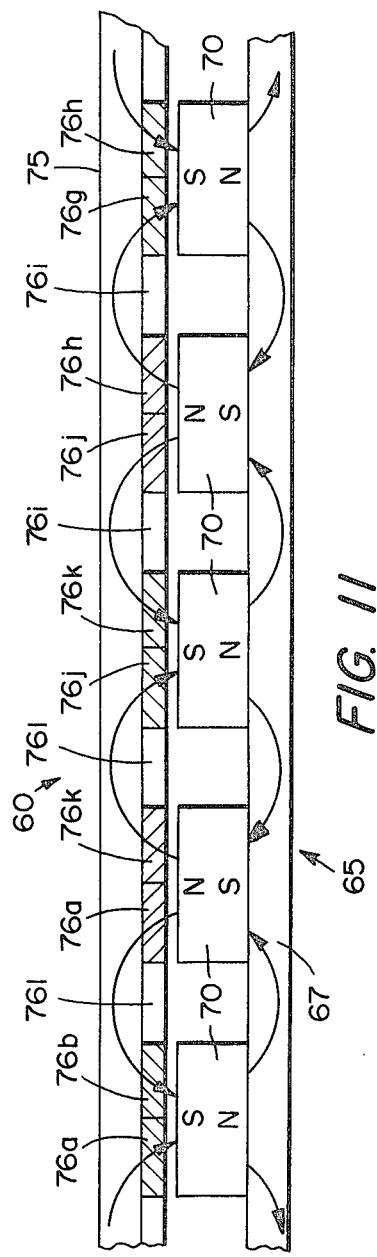
FIG. 11 is a diagrammatic illustration of the alternating polarity, magnetic circuit for the operation of the motor shown in FIG. 4.

Illustrated in FIGS. 1-3 is a machine 25 for the maintenance of floors. The machine 25 comprises a body 26. Bolted to the body 26 is a handle assembly 27. At the rear end of the body 26 are mounted wheels 28. Fixed to the body 26 at the base thereof is a stator housing 29 of a motor 30. A depending shaft 31 is fixed to the stator housing 29 along the axis thereof. A rotor housing 35 for the motor 30 is journalled for rotation about the fixed shaft 31 by means of suitable bearings 36. Secured to the rotor housing 35 for rotation therewith is a pad holder 37. The pad holder 37 is integrally formed with the rotor housing 35 or is attached thereto by a suitable adhesive or bonding agent. Secured to the pad holder 37 for rotation therewith is a floor maintenance pad or brush 40. Closely spaced drive pins or tufts made of rigid plastic are embedded in the pad holder 37 to project downwardly therefrom. The pad or brush 40 is placed under the pad holder 37 with the pad or brush 40 secured to the pad holder by suitable means, such as bolts and mats. The application of the pad 40 upon a floor surface serves to polish, clean, maintain or the like a floor surface.

The handle 27 comprises a handle bar 41 (FIGS. 1 and 2) which is gripped manually by an operator. Attached to the handle bar 41 is a switch housing 42. An electrical cord 43 is connected to the switch housing 42. An electrical on-off switch 44 is mounted on the switch housing 42 for connecting or disconnecting the source of electrical power to the motor 30.

Secured to the handle bar 41 and attached to switch housing 42 are suitable tubular members 48 and 49 that extend to the upper and rearward section of the body 26. From FIG. 1, it is to be observed that the floor engaging surfaces of the wheels 28 are about the floor engaging surface of the pad 40. Normally, the pad 40 engages the floor. By moving the body 26 downwardly through the application of a downward force from the handle bar 41, the machine 25 is raised at the forward end thereof and lowered at the rear end thereof. Through this action, the wheels 28 are lowered to the floor and the pad 40 is removed from engagement with the floor. An operator can now move the machine 25 to various locations or can replace worn pads. To use the machine 25, the pad 40 is in floor engaging position.

The tubular members 48 and 49 are attached to the base 26 through suitable bolts allowing free movement of the tubular members 48 and 49 through 180° (FIG. 1). Thus, the tubular members 48 and 49 can be moved forwardly until parallel to the floor; can be moved rearwardly until parallel to the floor; and can be moved to a position therebetween including a position at right angles to the floor or at any convenient operating angle relative to the floor. A conventional and well-known latch-release mechanism 55 is disposed around the bolts 56 between the tubular members 48 and 49, respectively, and the body 26 for retaining the tubular members 48 and 49 in an adjusted position relative to the body 26. In U.S. Pat. No. 4,330,897, there is disclosed a block that provides frictional engagement between the tubular member and the wall of a bracket to enable the tubular member to be retained in a selected angular position and to be retained in any of a plurality of adjusted positions. This arrangement by reversal of parts may be employed equally as well in the present machine.

The electric motor 30 comprises a stator or armature 60 and a rotor or permanent magnet assembly 65. The stator housing 29 is part of the stator 60 and the rotor housing 35 is part of the rotor 65.

The rotor 65 comprises an annular body 66 made of non-magnetic material, such as cast aluminum. The annular body 66 is journalled for rotation about the shaft 31 through the bearings 36. Fixed to the body 66 for rotatable movement is an iron backing ring 67. The iron ring 67 is disposed concentrically with the annular body 66 for rotation about the axis of the shaft 31, but is of smaller diameter than the annular body 66 (FIG. 7).

Fixed to the iron ring 67 at equal angular distances apart is a plurality of even number permanent magnets 70. The body 26 is formed with wells in which seat the magnets 70 and the iron ring 67 (FIG. 8). A suitable adhesive, such as epoxy resin, holds the magnets 70 and the iron ring 67 fixedly secured to the body 66. The epoxy resin also encapsulates the magnets 70 and the iron ring 67. In the preferred embodiment, there are eight magnets 70. Each magnet 70 has, in the preferred embodiment, a trapezoidal or wedge configuration. The magnets 70, which are preferably a ceramic-type permanent magnet, are disposed with their smaller dimension parallel to the axis of rotation of the rotor 65. The magnets 70 are relatively flat. In the exemplary embodiment, each magnet 70 is approximately one inch in the axial direction and two and eight tenth inches in the radial direction. The magnets 70 are arranged in equal radial distances relative to the axis of rotation of the rotor 60 with successive co-planar sections of the magnets of opposite polarity (FIG. 7). Each magnet forms poles of approximately a thirty degree arc and the angular distances between successive magnets 70 are approximately fifteen degrees.

The armature stator 60 comprises the annular housing 29 which is fixed to the body 26. The annular housing 29 is formed from non-magnetic material, such as cast aluminum. Formed in the annular housing are wells in which is seated an iron ring 75 and an armature winding 76. The iron ring 75 is concentric with the annular housing 29, but of reduced diameter. A suitable adhesive, such as an epoxy resin, encapsulates and fixedly secures the armature winding 76 and the iron ring 75 to the annular housing 29. The iron ring 75, as well as the iron ring for the rotor 65, is made of soft magnetic material, such as electric motor grade silicon-iron alloy of the grain-oriented variety. The iron rings 67 and 75 define generally the annular magnetic field regions for the rotor 65 and the stator 60, respectively.

The armature winding 76, in the preferred embodiment, comprises 12 coils 76a–76l forming an annular array of coils about the axis of the shaft 31 (FIGS. 9 and 10). Each coil has a generally trapezoidal configuration that extends radially from the axis of the shaft 31. The length of the coil in the axial direction is of a lesser dimension than the coil in the radial direction. Each coil 76 is relatively flat. In the exemplary embodiment, each coil is approximately 0.25 inches in the axial direction and 5.5 inches in the overall radial direction. Each coil extends an angular distance of thirty to sixty degrees when measured from minimum dimension to maximum dimension. Since each coil has two segments, each coil segment covers an angular distance of fifteen degrees. Adjacent successive coils overlap. In the preferred embodiment, the center-to-center angular distance between successive overlapping coils is thirty degrees at the inner radius and the center-to-center angular distance at the inner radius between coils in the same layer is sixty degrees. A set of six coils 76b, 76d, 76f, 76h, 76j and 76l overlap a set of six coils 76a, 76c, 76e, 76g, 76i and 76k but are offset by an angular distance of thirty degrees. Each coil is in an overlapping relation to another coil segment. The layers of coils interweave.

Figure 12:
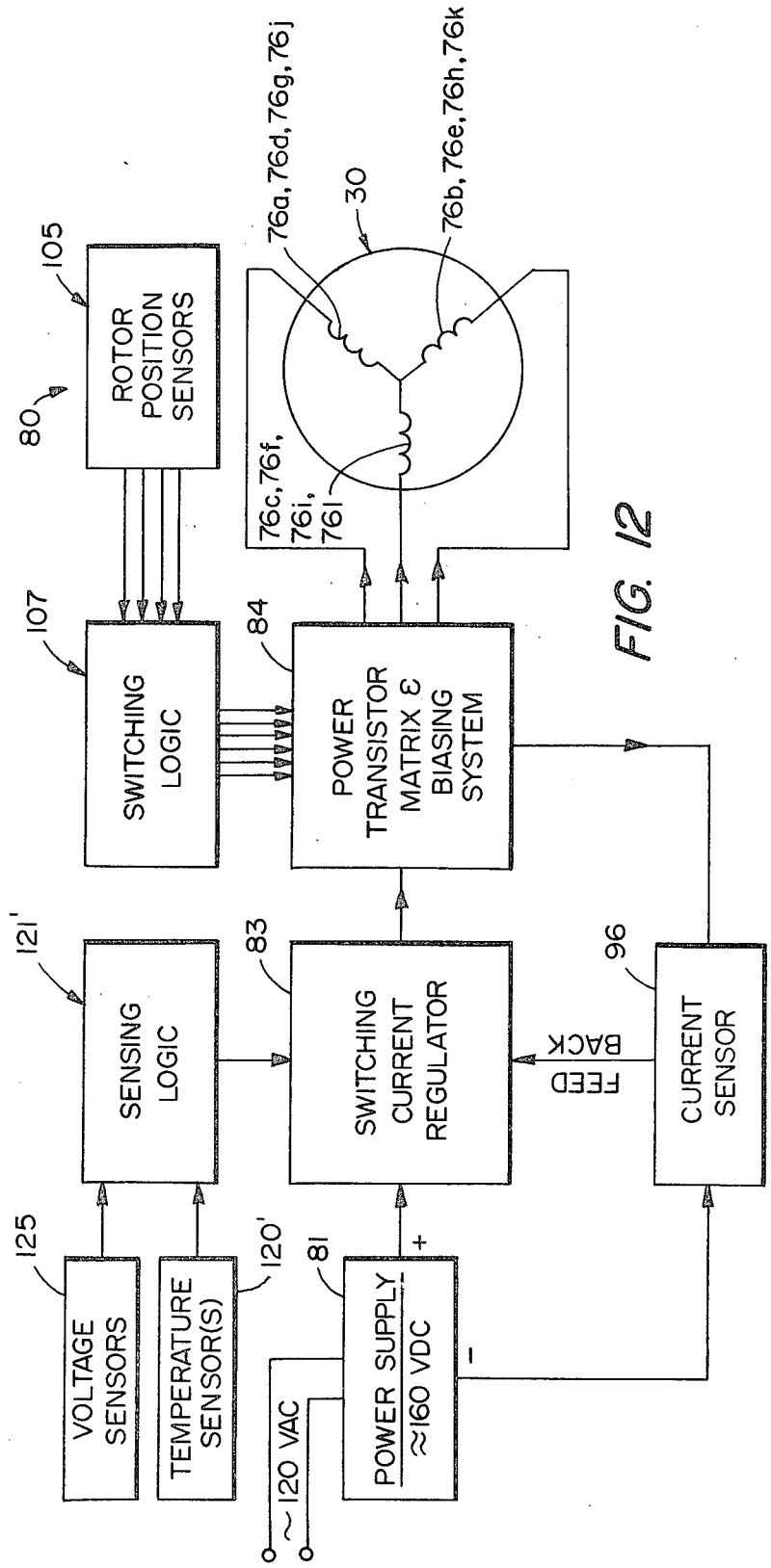
FIG. 12 is a block diagram of a switching circuit for exciting the armature winding of the stator of the motor shown in FIGS. 9 and 10.
Figure 13:
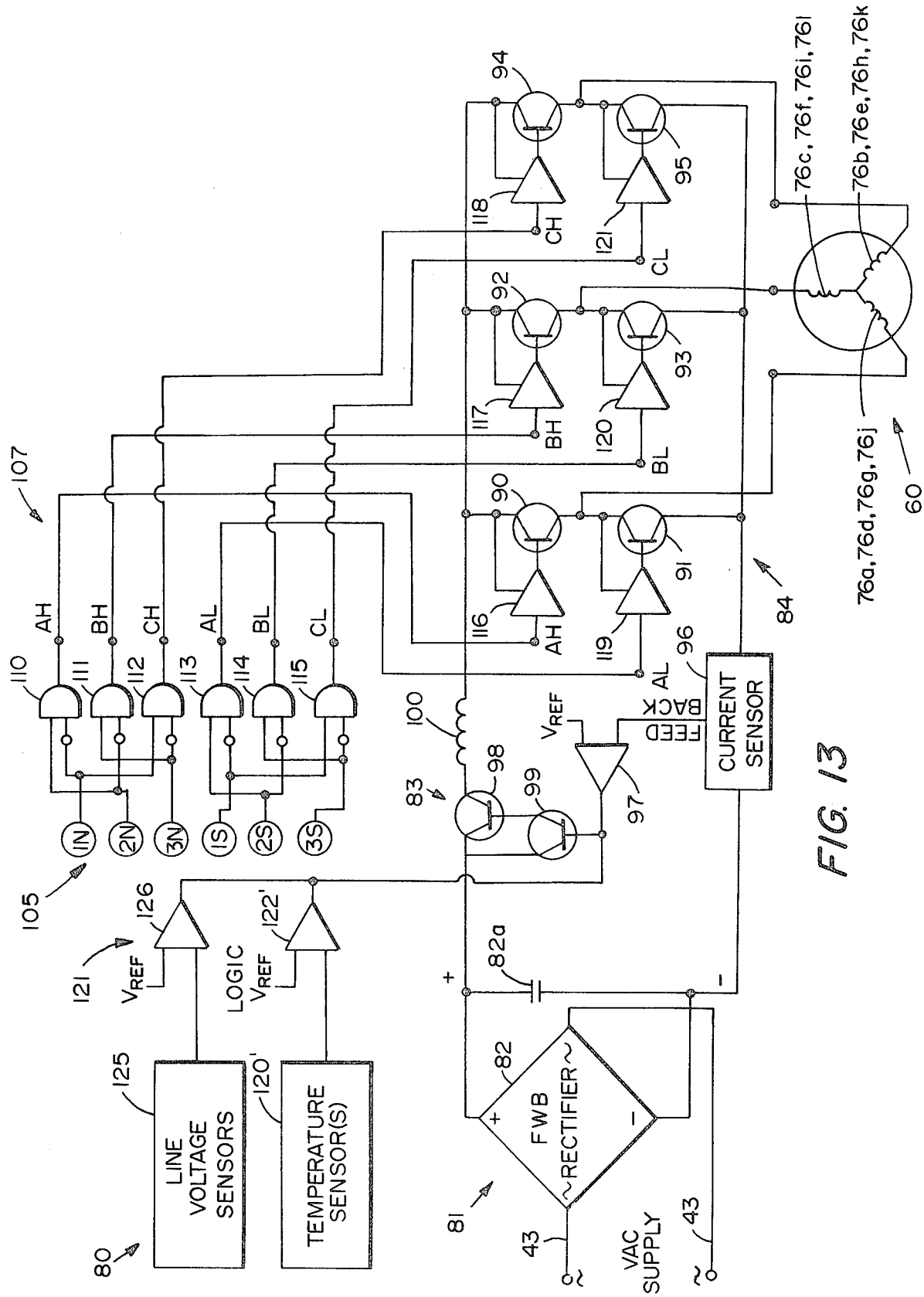
FIG. 13 is a schematic diagram of the switching circuit shown in FIG. 12.
Figure 14:
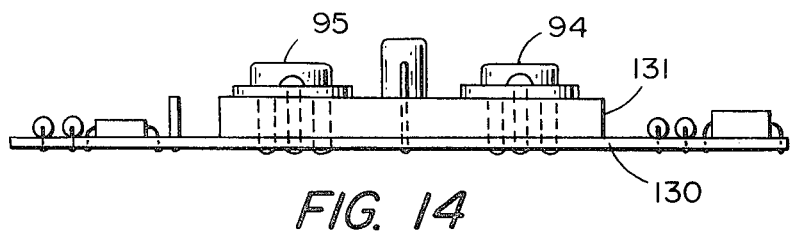
FIG. 14 is a diagrammatic elevation view of an arrangement for mounting electrical components employed in the switching circuit shown in FIGS. 12 and 13.

For imparting rotation to the rotor 65, the armature winding 76 is excited by a three phase switching circuit 80. As shown in FIGS. 12 and 13, each phase winding is formed by four coils 76. Thus, phase A winding is formed by the interconnection of the coils 76a, 76d, 76g and 76j. Phase B winding is formed by the interconnection of the coils 76c, 76f, 76i and 76l and the phase C winding is formed by the interconnection of coils 76b, 76e, 76h and 76k.

Rotation of the motor 65 is achieved by the flow of current through the armature winding 76 at right angles to the permanent magnet field created by the permanent magnets 70 which produces a torque on the rotor 65 to rotate the same about the axis of the shaft 81. An electric current flowing in an armature winding and advancing through a permanent magnetic field at right angles to the field flux will produce a force therebetween at right angles to each other. The armature windings are at right angles to the desired direction of applied force, which applied force is the torque applied to the rotor for rotary movement.

In the preferred embodiment of the present invention, there are twelve coils 76a–76l, which provide twenty-four armature winding segments, and eight permanent magnets 70. Thus, there are three armature winding segments for each permanent magnet 70. Two coil segments approximately equal in angular distance the confronting surface of a permanent magnet 70. One revolution of the rotor 66 is completed every four cycles of operation of the three phase, alternating polarity, switching sequence. One full cycle of the three phase, switching sequence is completed for every six changes of state of the three phase alternating polarity (bi-polar) sequence of the twenty-four armature segments. The rotor advances one armature segment for each change of state. The excitation pattern is one segment (fifteen degrees) for each change of state.

The three phase switching circuit 80 (FIGS. 12 and 13) comprises a suitable high voltage power supply 81 for producing a high voltage d.c. voltage. The power supply 81 has an a.c. input from a suitable source over conductor 43 and a fullwave rectifier 82 with suitable capacitor filter 82a. A low voltage power supply, not shown, provides a low voltage d.c. voltage for the logic circuits and sensors. The conductors 43 extend to the body 26 inside either the tube 48 or the tube 49.

Connected to the output of the power supply 81 is a current regulator 83 that serves to maintain the current flow below a preselected maximum to prevent overloading the source of power. A power transistor matrix and biasing network 84 is connected to the output of the current regulator 83. Included in the network 84 are transistor power switches 90–95. The operation of the transistor power switches 90 and 91 control the flow of current in the armature coils 76a, 76d, 76g and 76j (phase A) and the operation of the transistor power switches 92 and 93 control the flow of current in the armature coils 76c, 76f, 76i and 76l (phase B). Lastly, the flow of current through the armature coils 76b, 76e, 87h and 76k (phase C) is controlled by the transistor power switches 94 and 95. Connected to the output of the transistor power switches 90–95 is a current sensor 96 which comprises suitable diodes or resistors. The flow of current from the transistor power switches 90–95 is detected by the current sensor 96, which applies a voltage to a comparator circuit 97 of a magnitude representative of the current detected by the current sensor 96. A reference voltage is also applied to the comparator circuit 97. When the voltage applied to the comparator circuit 97 by the current sensor 96 exceeds the reference voltage, the comparator circuit 97 operates to change transistor power switch 98 of the current regulator 83 to an OFF state via a base drive amplifier 99 and when the voltage applied to the comparator circuit 97 is less than a preselected reference voltage, the transistor power switch 98 returns to an ON state. The inductor 100 of the current regulator 83 serves as a choke coil.

Figure 16:
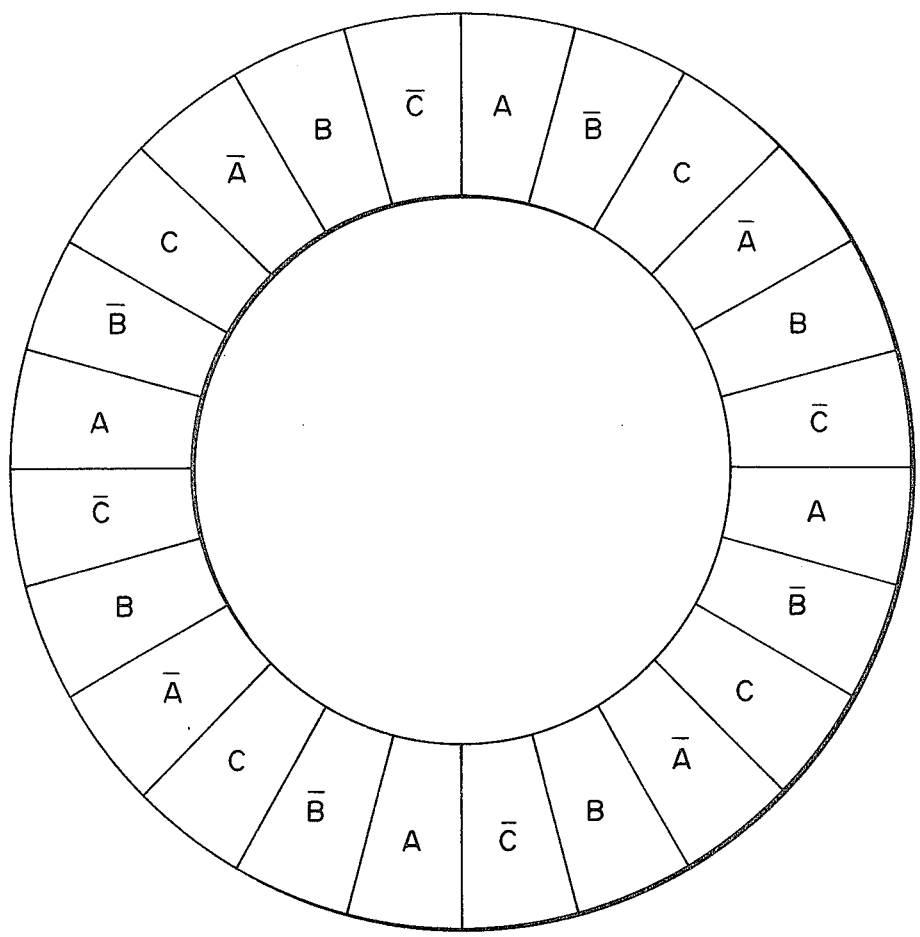
FIG. 16 is a graphic illustration of a full phase diagram of the armature winding for the stator illustrated in FIG. 9.
Figure 17:
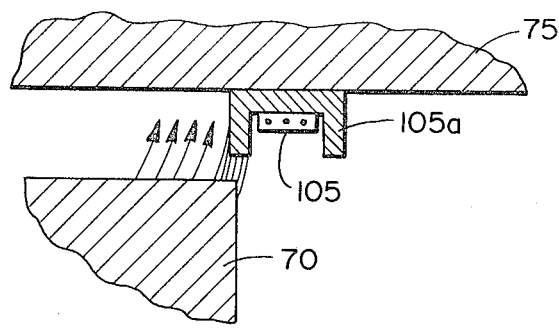
FIG. 17 is a fragmentary, diagrammatic illustration of a rotor sensor mounted in a channel member.

For energizing the armature segments in a sequence to effectively vary the electrical current throughout the armature winding 76 in order to maintain precise phase timing between the electric fields of the armature winding 76 and the magnetic fields of the permanent magnets 70, rotor sensors 105 and switching logic circuit 107 are provided. In the preferred embodiment, the rotor sensors 105 include well-known Hall generators referred to in U.S. Pat. No. 4,125,792, which produce voltage output in response to the sensing of magnetic field variations. More specifically, open collector switching type Hall integrated circuits are used, which are manufactured by Sprague Electric Co. as UGN3019T integrated circuits. Each sensor 105 includes two Hall integrated circuits for bi-polar sensing. The rotor sensors 105 are located within gaps (FIG. 9) of the armature winding 76 and are held in position by the epoxy resin holding the armature winding 76 and the iron ring 75 onto the body 29. For increased switching accuracy, each magnetic sensor 105 is disposed in ferrous channel member 105a (FIG. 16). The sensors 105 should be mounted in the same radial plane at equal angular distances apart. There are three rotor sensors 105. Successive rotor sensors 105 are spaced apart an angular distance of sixty degrees. Each rotor sensor 105 is bi-polar, since the magnetic fields of the rotor 65 are bi-polar. The members 105a focus the magnetic fields sensed by the sensors 105 to improve the magnetic sensing characteristic of the sensors 105.

Successive rotor sensors 105 will produce six sensor outputs, since each sensor 105 is bi-polar and the rotor provides alternating polarity bi-polar fields. The sensor outputs are applied to the logic circuit 107. The logic level outputs of the sensors 105 are combined through AND gates 110-115 to produce six logic signals on the terminals AH, BH, CH, AL, BL and CL, respectively. The output of the AND gate 110 is applied to a base drive amplifier 116 that controls the operation of the transistor power switch 90. Similarly, the output of the AND gate 111 is applied to a base drive amplifier 117 to control the operation of the transistor power switch 92. In a like manner, the output of the AND gate 112 is applied to the base drive amplifier 118 to control the operation of the transistor power switch 94.

The output of the AND gate 113 is applied to a base amplifier 119 to control the operation of the transistor power switch 91. The output of the AND gate 114 is applied to a base drive amplifier 120 to control the operation of the transistor power switch 93. Lastly, the output of the AND gate 115 is applied to a base drive amplifier 121 to control the operation of the transistor power switch 95. By controlling the operation of the transistor power switches 90-95 through the base drive amplifiers 116-121, the three phase bi-polar excitation current is applied to the armature winding 76 for rotating the rotor 65. The base drive amplifiers 99 and 116-121 are biasing networks for the transistor power switches 98 and 90-95. The transistor power switches 98 and 90-95 are operated in a saturated switching mode to minimize power loss and to reduce heat dissipation problems. A general discussion of control circuits for brushless d.c. motors can be found in chapter 6 of the publication by Electro-Craft Corporation of Hopkins, Minn., entitled DC MOTORS SPEED CONTROL SERVO SYSTEMS.

To impart a turning moment on the rotor 65, the coil segments conduct current at right angles to the permanent magnetic field produced by the permanent magnets 70. As the rotor 65 is rotated, the magnetic sensors 105 sense variations in magnetic fields and the coil segments are excited electrically to maintain generally the relation shown in FIG. 11.

Figure 15:
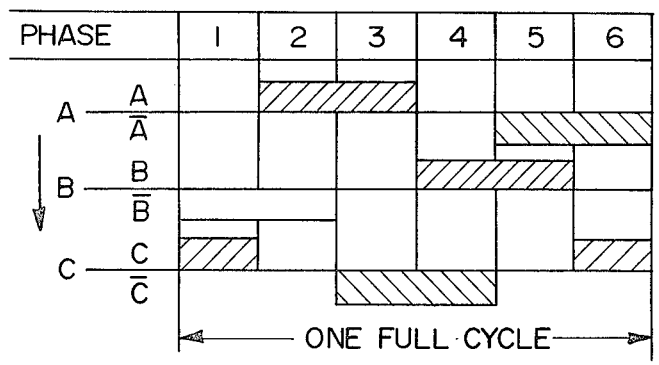
FIG. 15 is a graphic illustration of the phase sequencing of excitation current from the switching circuit shown in FIGS. 12 and 13.

The current phase sequencing through the coil segments occurs in the manner shown in FIG. 15 in which a letter indicates a current polarity for a phase and a bar over the same letter indicates the opposite polarity for a phase. There are three phases of switching current, i.e., phase A, phase B and phase C. Thus, each coil 76a-76l, when energized, respectively produces one energized segment thereof of one polarity and a simultaneously energized segment thereof of an opposite polarity. The segments of each coil are of opposite radial polarity, which alternate in current polarity.

The full phase diagram of the armature winding 76 is shown in FIG. 16, which illustrates the phases A, B and C and the current flow through the armature winding 76, and particularly the coil segments thereof.

Figure 18:
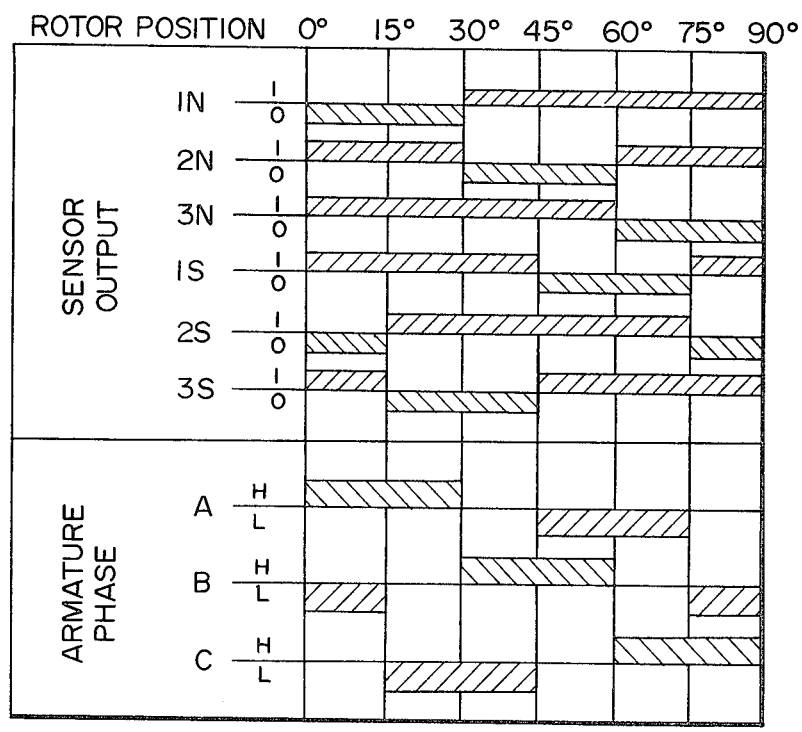
FIG. 18 is a truth table illustrating the relationship between the position of the tor, rotor position sensor output and armature switching phase.

In FIG. 18, there is illustrated a truth table to show the relationship between rotor position, rotor sensor output and armature phase. The N or S indicates the polarity of successive sensors 105. The 1-0, 1-0, 1-0 are the logic level outputs for the successive sensors 105 at the polarity shown. H, L represents the direction of current in the coil segments of the armature winding 76. One full cycle is shown in the truth table. Thus, a complete revolution of the rotor 65 equals four complete excitative cycles of the armature winding 76. Logic zero output for a sensor 105 or a logic zero input to an AND gate 110-115 indicates the presence of an appropriate rotor polarity. A logic one output for a sensor 105 or a logic one input to an AND gate 110-115 indicates an absence of an appropriate rotor polarity. A logic zero output from an AND gate 110-115 indicates an appropriate phase winding is not excited. A logic one output from an AND gate 110-115 indicates an appropriate phase winding is excited.

Disposed with the housing 26 is a conventional temperature sensor 120', such as the temperature sensor MTS102 manufactured by Motorola. The output of the temperature sensor 120' is connected to one input of a suitable comparator circuit 122' of a logic circuit 121'. A reference voltage is applied to the other input of the comparator circuit 122'. The greater the temperature, the lesser the amplitude of the voltage applied to the one input of the comparator circuit 122'. When the output voltage of the temperature sensor 120' falls below the reference voltage applied to the comparator circuit 122', an enable voltage from the base drive amplifier 99 turns OFF the current regulator 83 for operating the transistor power switches in an OFF mode. After the temperature is reduced to normal, the output voltage of the temperature sensor 120' is increased to turn on the base drive amplifier 99 for turning ON the current regulator 83 for enabling the transistor power switches 90-95 to operate.

In order to turn OFF the current regulator 83 in the event the alternating current voltage from the source of power across the conductors 43 is below a predetermined magnitude, a voltage sensor 125 in the form of a resistor is provided. The voltage sensor 125 senses the A.C. voltage applied across the conductors 43. In the event the line voltage across the conductors is less than a predetermined magnitude, the voltage sensor 125 applies a voltage to a comparator circuit 126 of the logic circuit 121 less than the reference voltage applied to the other input of the comparator circuit 126. This action changes the state of the base drive amplifier 99 to turn OFF the current regulator 83. When the line voltage reaches its preselected magnitude, the voltage applied to the comparator circuit 126 is greater than the reference voltage and the base drive amplifier 99 returns the current regulator 83 to its normal operating condition.

Disposed within the body 26 is a printed circuit board 130. Mounted on the printed circuit 130 are the transistor power switches 90-95, the base drive amplifiers 116-121, and the AND gates 110-115. For dissipating heat to inhibit malfunctioning of electrical components a heat sink substrate or plate 131 made of aluminum is fixed to the printed circuit board 130. Effective heat dissipation is required to reduce power transistor failures and breakdown. The transistor power switches 90-95 are mounted on the printed circuit board 130 above the heat sink substrate 131. The heat sink substrate contacts the body 26 for conducting heat outside of the body 26. Suitable electrical insulation is provided between the heat sink substrate 131 and the cases of the transistor power switches 90-95. A separate aluminum casting for the body 26 is provided for electrical components, such as the transistor power switches, from overheating through heat dissipation techniques.

As shown in FIGS. 4 and 5, the pad holder 37 has a convex surface facing the floor pad 40. Through this arrangement a greater force from the machine weight is applied to the central area of the pad 40 about the central opening thereof and a lesser force from the machine weight is applied about the perimeter area of the pad 40. For a given motor capacity, the convex surface of the pad holder 37 facing the floor pad 40 improves the work capability.

Illustrated in FIG. 6 is an arrangement for applying chemicals to the floor during the rotation of the floor pad or brush 40. A chemical applicator 140 includes a chemical storage container 141 that is mounted on the tube 49. An electric liquid pump 142 is mounted on the tube 49 below the storage container 141. A switch 143 (FIG. 1) is actuated for controlling the application of line voltage over the conductors 43 to the electric pump for controlling the operation thereof.

Communicating with the pump 142 is a tube 144 through which the chemical liquid is pumped. At the free end of the tube 144 is a spray nozzle 145 to spray chemicals axially through the opening of the pad or brush 40 onto the floor.

Encircling the stator housing 29 of the motor 30 and the rotor housing 35 of the motor 30 is a bumper 150. The bumper 150 is made of suitable material, such as a rubber or plastic. Along the inner wall of the bumper is a groove 151 (FIG. 4) to receive an annular ridge 152 formed on the outer wall of the stator housing 29. The bumper 150 is removed and replaced with facility and ease of operation. By varying the dimension of the bumper 150 in the downwardly direction, the bumper may be employed as a skirt, splashguard or dust seal. Thus, the member 150 is not only removably secured with facility and ease of operation, but can be employed for multi-functional purposes by merely designing various dimensions and configurations for the downwardly extent thereof. The bumper 150 may be formed with a tear drop configuration to accommodate a vacuum inlet port.

Illustrated in FIG. 19 is a pad holder 155, which is a modification of the pad holder 37 shown in FIG. 5. Integrally formed with the pad holder 155 is a centering hub 156. In the preferred embodiment, the centering hub 156 is tapered in the downwardly direction and extends from 0.2 inches to 0.6 inches from the convex surface of the pad holder 155. The preferred extension for the hub 156 is 0.25 inches. A conventional pad or the like with a central opening can be attached to the pad holder 155 and will be automatically centered. Similarly, a brush can be bolted to the pad holder and will be automatically centered.

Figure 20:
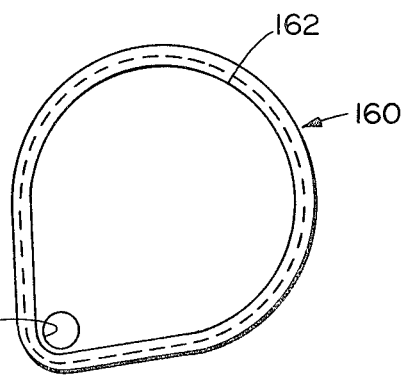
FIG. 20 is a modification of a bumper encircling the machine shown in FIG. 1.

In FIG. 20 is illustrated a bumper 160, which is a modification of the bumper 150 shown in FIG. 4. The bumper 160 has a tear drop configuration to accommodate a vacuum port 161 should the floor machine 25 be constructed with a vacuum system. The bumper 160 encircles the stator housing 29 of the motor 30 and is formed with a groove 162 similar to the groove 151 (FIG. 4). The groove 162 receives a ridge formed on the outer wall of the stator housing 29 similar to the ridge 152 (FIG. 4).

We claim:

1. A floor machine comprising:
   (a) a body;
   (b) a stator housing supported by said body;
   (c) a shaft disposed in said stator housing with the axis thereof coincident with the axis of said stator housing;
   (d) armature winding supported by said stator housing concentric therewith, said armature winding including an array of radially disposed coils with the axial extent of said coils less than the radial extent of said coils taken respectively;
   (e) a rotor housing journalled for rotation relative to said stator and having an axis coincident with the axis of said shaft;
   (f) an array of radially disposed permanent magnets supported by said rotor housing concentric therewith for concurrent movement, said permanent magnets having alternate magnetic fields in succession with the axial extent of said permanent magnets less than the radial extent of said permanent magnets taken respectively;
   (g) a plurality of sensors in said stator housing disposed concentrically with said armature winding and responsive to said permanent magnets; and
   (h) a switching circuit responsive to said sensors and connected to said armature winding for exciting said armature winding to impart rotation to said rotor housing;
   (i) said rotor comprising means adaptable for supporting floor maintenance means.

2. A floor machine as claimed in claim 1 wherein said armature winding comprises a plurality of coils wound in juxtaposed relation and disposed in a radial plane.

3. A floor machine as claimed in claim 2 wherein said coils are relatively flat.

4. A floor machine as claimed in claim 3 wherein said permanent magnets are relatively flat.

5. A floor machine as claimed in claim 2 wherein the ratio of coils to permanent magnets is 3 to 2, and wherein said switching circuit produces a three phase excitation in said armature winding.

6. A floor machine as claimed in claim 1 wherein said armature winding comprises superposed layers of coils, each of said layers of coils comprises a plurality of coils wound in juxtaposed relation and disposed in a radial plane, the coils of one layer arranged to interweave with the coils of another layer.

7. A floor machine as claimed in claim 6 wherein the coils of said one layer are angularly displaced with respect to the coils of said other layer relative to the axis of said armature winding.

8. A floor machine as claimed in claim 7 wherein said coils of said one layer and the coils of said other layer are relatively flat.

9. A floor machine as claimed in claim 1 wherein said switching circuit comprises a current regulator responsive to the current flow in said switching circuit for the excitation of said armature winding for limiting the magnitude of the excitation current applied to said armature winding.

10. A floor machine as claimed in claim 9 wherein a current sensor senses the magnitude of the excitation current applied to said armature winding and applies a voltage to said current regulator representative of the magnitude of the excitation current applied to said armature winding.

11. A floor machine as claimed in claim 10 wherein said current regulator comprises a comparator circuit to compare the magnitude of the voltage applied thereto by said current sensor with the magnitude of a reference voltage.

12. A floor machine as claimed in claim 1 wherein said means adaptable for supporting floor maintenance means comprises a surface formed with a convex configuration.

13. A floor machine as claimed in claim 12 wherein said means adaptable for supporting floor maintenance means includes an integrally formed centering hub extending from said convex surface.

14. A floor machine as claimed in claim 1 and comprising a handle assembly pivotally attached to said body for angular movement in excess of ninety degrees and means between said body and said handle assembly for retaining said handle assembly in a selected position.

15. A floor machine as claimed in claim 1 wherein said shaft includes an axial opening therethrough and said means for supporting floor maintenance means includes an axial opening therethrough coincident with the axial opening of said shaft, and said floor machine further comprising a chemical applicator, said chemical applicator comprising a container for storing a supply of chemicals, and a conduit communicating with said container and extending into the opening of said shaft for discharging the chemical onto a floor.

16. A floor machine as claimed in claim 15 wherein said chemical applicator includes a pump for increasing pressure on the flow of the chemical.

17. A floor machine as claimed in claim 1 wherein said stator housing is formed with an annular ridge along a peripheral wall thereof, and a member disposed along said ridge of said stator housing and encircling said stator housing, said member being formed with an annular groove mating with said ridge to retain said member on said stator housing.

18. A floor machine as claimed in claim 17 wherein said member is made of yieldable material.

19. A floor machine as claimed in claim 1 wherein said sensors are disposed in the same radial plane relative to said axis at equal distances from said axis.

20. A floor machine as claimed in claim 1 and comprising channel-shaped magnetic members for mounting said sensors respectively in said stator housing for magnetic focusing to improve magnetic sensing characteristics of said sensors.

21. A floor machine as claimed in claim 1 wherein said switching circuit comprises a plurality of power switches for controlling the excitation of said armature winding to impart rotation to said rotor housing, and a logic circuit interposed between said sensors and said power switches for controlling the operation of said power switches in response to the operation of said sensors.

22. A floor machine as claimed in claim 19 wherein said switching circuit comprises means interconnecting said logic circuit and said power switches for controlling the on-off state of said power switches in response to the output of said logic circuit.

23. A floor machine as claimed in claim 19 wherein said power switches are transistor power switches and said switching circuit further comprises a heat sink substrate on which said transistor power switches are mounted for the dissipation of heat.

24. A floor machine as claimed in claim 1 and comprising a temperature sensor for said body, and a logic circuit responsive to said temperature sensor for controlling the operation of said switching circuit in the continuance and discontinuance of the excitation of said armature winding.

25. A floor machine as claimed in claim 1 and comprising a line voltage sensor, and a logic circuit responsive to said line voltage sensor for controlling the operation of said switching circuit in the continuance and discontinuance of the excitation of said armature winding.

* * * * *

UNITED STATES PATENT OFFICE
CERTIFICATE OF CORRECTION

Patent No. 4,443,906                    Dated April 24, 1984

Inventor(s) Hartwell F. Tucker; Jeffrey R. Tucker; Dennis Ross; Jeffrey G. Knirck It is certified that error appears in the above-identified patent and that said Letters Patent are hereby corrected as shown below:

Column 1, Line 40, change "Berrington" to ---Bevington---;

Column 3, Line 27, change "tor" to ---rotor---;

Column 3, Line 55, change "mats" to ---nuts---;

Column 9, Line 4, after the comma, second occurrence, insert ---to prevent---;

Column 9, Line 4, cancel "from";

Column 9, Line 5, change "through" to ---by using---;

Column 10, Line 13, after "stator" insert ---housing---;

Column 10, Line 29, after "rotor" insert ---housing---.

Signed and Sealed this

Twenty-fifth Day of September 1984

[SEAL]

Attest:

GERALD J. MOSSINGHOFF

Attesting Officer

Commissioner of Patents and Trademarks